July 20, 1965 J. R. TURK 3,196,301
HYDRODYNAMIC BEARINGS FOR A MOTOR
Filed March 20, 1962
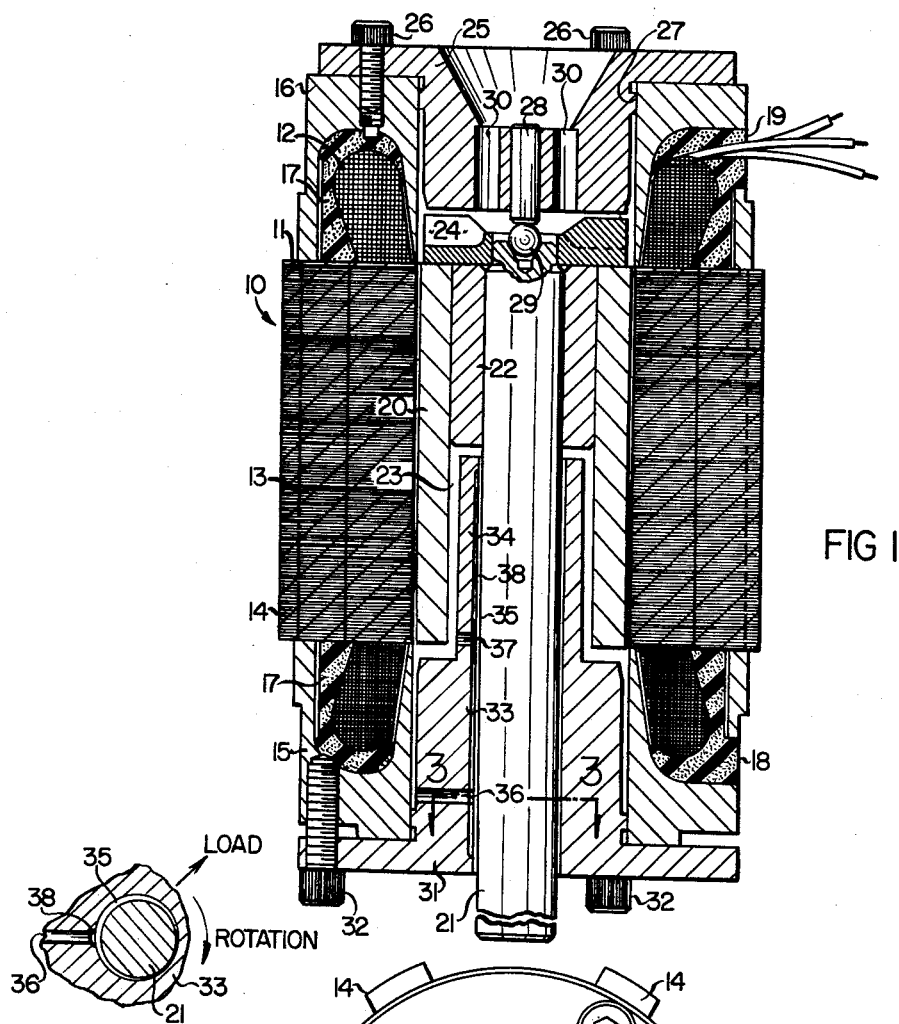
FIG 1
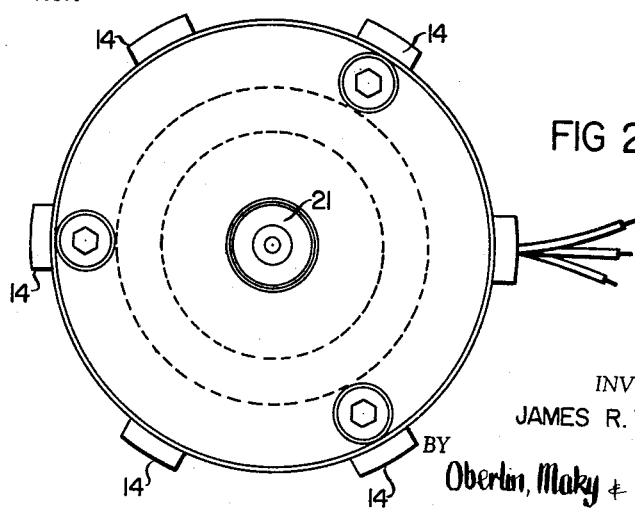
FIG 3
FIG 2
INVENTOR.
JAMES R. TURK
BY Oberlin, Maky & Donnelly
ATTORNEYS

3,196,301
HYDRODYNAMIC BEARINGS FOR A MOTOR
James R. Turk, Euclid, Ohio, assignor to
Vincent K. Smith, Gates Mills, Ohio
Filed Mar. 20, 1962, Ser. No. 181,072
6 Claims. (Cl. 310—90)

This invention relates to dynamoelectric machines and, more particularly, to dynamoelectric machines having fluid bearings.

In the construction of high quality electric motors it is conventional to employ precision ball bearings for journalling the rotor in the stator. However, such ball bearing motors cannot be used for high speed operation owing to limited capacities of the balls, heat generation caused by the balls skidding in their raceways, the throwing out of the ball bearing lubricant, and the development of a beat frequency as the angular relationship of the balls of the respective bearings changes. Moreover, the fitting of precision ball bearings in the motor frame and on the rotor entails expensive and time-consuming manufacturing problems.

It is, therefore, an object of this invention to provide a dynamoelectric machine having a fluid bearing in which ambient air constitutes the sole film-forming lubricant, whereby the machine can be designed for practically unlimited high speed operation without the aforementioned drawbacks of precision ball bearing machines.

Another object is to provide such fluid bearing machines which can be simply and relatively inexpensively made.

Other objects and advantages to the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a diametral cross-section view of a dynamoelectric machine according to this invention;

FIG. 2 is an end elevation view as viewed from the bottom of FIG. 1; and

FIG. 3 is a transverse cross-section view along line 3—3, FIG. 1.

Referring now to the drawing, there is shown a stator assembly 10 comprising a stack of electrically insulated slotted annular core laminations 11 defining a spider in which a plurality of coils 12 are wound. The spider laminations 11 are enclosed in a tightly fitting laminated yoke 13 which has a series of projections 14 on its periphery. A pair of end rings 15 and 16 are connected to the ends of the stator assembly 10 as by welding, brazing, or other suitable means. Each ring 15 and 16 has an annular recess which accommodates the ends of the coils 12 and is adapted to be filled with an electrically insulating compound 17, e.g., epoxy resin, through the openings 18 and 19. The compound 17 will also enter the slots in the stack 11 filling any voids between the windings 12 therein and the yoke 13. The inside diameter of each of rings 15 and 16 is slightly greater than the inside diameter of the laminations 11.

The rotor assembly illustrated in the drawings comprises an annular rotor shell 20 of high hysteretic material, e.g., chromium or cobalt steel, mounted on a rotor shaft 21 by means of a sleeve 22 which fits tightly on the shaft 21 and to which the rotor shell 20 is also tightly fit. Since the sleeve 22 only extends for somewhat less than half the length of rotor shell 20, an annular space 23 is provided in one end of the rotor assembly between the shaft 21 and the rotor shell 20.

At the other end of the rotor assembly, an impeller 24 is attached to the shaft 21 adjacent the end of the rotor shell 20. A flanged end plug 25 is mounted on the stator assembly by means of screws 26 through its flanged portion engaging threaded holes in end ring 16. Portion 27 of the end plug 25 protrudes within the end ring 16; at the center is a thrust pad 28 which is adapted to engage ball 29 which fits in a countersink at the center of the rotor shaft 21. Surrounding the thrust pad 28 are a plurality of orifices 30 which permit fluid to be drawn through the end plug 25 to the interior of the machine by the action of the impeller 24.

At the end of the machine opposite end plug 25, a flanged end member 31 is mounted on the stator assembly by means of screws 32 through its flanged portion engaging holes in end ring 15. The end member 31 has first and second concentric cylindrical portions 33 and 34 respectively with a shaft bore 35 extending concentrically through the entire member to accommodate the shaft 21. The first cylindrical portion 33 protrudes within end ring 15 the inside diameter of the latter being larger than the outside diameter of portion 33 leaving a substantial clearance therebetween. The second cylindrical portion 34 protrudes within annular space 23 but its exterior is of less diameter and length than the space 23 leaving a substantial clearance therebetween. The first and second cylindrical portions 33 and 34 have radial orifices 36 and 37 respectively communicating their surfaces with the shaft bore 35.

The radial clearance or air gap between the rotor shell 20 and the smooth cylindrical bore of stator 10 should be quite close depending upon various factors; however, in the instant case using air as the fluid, said air gap is preferably about 0.005 inch when the shell 20 is of 0.865 inch outside diameter. The radial clearance between the shaft 21 and the shaft bore 35 is between about 0.00015 and 0.0003 inch when air is the film-forming component. Further, it is preferred to construct the shaft 21 and the end member 31 of hardened steel and to polish the shaft 21 and bore 35 to a finish of 4 R.M.S. or better.

As best shown in FIG. 3, the radial orifices 36 and 37 lead to a longitudinal groove 38 in the wall of bore 35 which terminates short of the ends of bore 35, the groove 38, in the case of a radial load on the rotor shaft 21, leading to the no-load zone of the bearing.

In the operation of a 240 cycle, 14,400 r.p.m. motor, the rotation of the rotor will draw fluid, preferably air, in through orifices 30 by means of the impeller 24. The latter will pressurize the fluid at its periphery and thereby cause it to flow in the clearance between the rotor shell 20 and the stator bore. In the clearance space around the surface of the first and second cylindrical portions 33 and 34 the fluid pressure will be maintained through orifices 36 and 37 all along the clearance between the shaft 21 and the shaft bore 35 until it reaches the outer end of the end member 31. In this manner a fluid bearing is maintained between the shaft 21 and the end member 31. In addition, the air pressure acting against the ends of rotor shell 20 and sleeve 22 will tend to urge the entire rotor assembly toward the thrust pad 28 to at least partly offset an opposing axial load on the rotor shaft 21 while the ball bearing 29 acts as an axial thrust bearing to prevent drifting of the rotor assembly in the magnetic field. In addition, the magnetic flux will tend to keep the rotor centered within the stator field.

While in the foregoing example, the rotor speed was 14,400 r.p.m., the rotor speeds may be up to or exceed 100,000 r.p.m. insofar as the fluid bearing is concerned since it has unlimited lubricant supply and since there are no orbiting, rolling bearing elements.

It is considered that the film thickness between shaft 21 and bore 35 should not be less than 0.0001 inch. In the aforesaid example, with the shaft 21 in horizontal position, the minimum film thickness was not reached until the radial load was doubled from its normal value of 302.

Other modes of applying the principle of the invention may be employed, change being made as regards the details described, provided the features stated in any of the following claims or the equivalent of such be employed.

I therefore, particularly point out and distinctly claim as my invention:

1. A dynamoelectric machine comprising: a stator assembly with a cylindrical rotor bore therein and having first and second ends; a cylindrical rotor within the rotor bore of said stator assembly mounted on a shaft, said stator having a cylindrical annular recess in one end surrounding said shaft; a flanged end member having a shaft bore therethrough secured to said first end of said stator assembly receiving said shaft; said end member having elongated first and second cylindrical portions, said first cylindrical portion being of less diameter and length than said recess and lying therewithin, said second cylindrical portion being of less diameter than said rotor bore and lying therewithin, said cylindrical portions having orifices radially therethrough connecting their surfaces to said shaft bore; impeller means connected to said rotor adjacent said second end of said stator assembly operative to draw fluid into said machine and force said fluid between said rotor surface and said rotor bore and between said shaft and said shaft bore; and a thrust bearing mounted in said second end of said stator assembly against which said rotor and shaft are forced by said fluid.

2. A dynamoelectric machine comprising a stator assembly having first and second ends, a rotor within said stator assembly mounted on a shaft, the adjacent surfaces of said rotor and stator assembly being diametrically spaced to define a fluid bearing means between the adjacent surfaces thereof when said machine is in operation, an end member inserted into said first end of said stator assembly having a bore therein to receive said shaft, said bore being of greater diameter than said shafts also to define a fluid bearing means between the bore of said end member and said rotor shaft during operation of said machine as aforesaid, both of said fluid bearing means being operative totally to support said rotor and rotor shaft in said stator assembly and said end member.

3. A dynamoelectric machine according to claim 2 including impeller means connected to said rotor adjacent said second end of said stator assembly operative to draw fluid into said machine and force said fluid between said rotor surface and said stator assembly and between said shaft and said end member, and a thrust bearing between said rotor and said second end of said stator assembly, said rotor having an area exposed to fluid pressure in said machine tending to urge said rotor toward said thrust bearing.

4. A dynamoelectric machine according to claim 2 wherein the diametral clearance between said shaft and the bore of said end member is from about 0.0003 to about 0.0006 inch.

5. A dynamoelectric machine according to claim 2 wherein the diametral clearance between said rotor and said stator assembly is about 0.0005 inch.

6. A dynamoelectric machine according to claim 2 wherein said shaft and said end member are of hardened steel and the surface of said shaft and said end member bore are polished to a finish of 4 R.M.S. or better.

References Cited by the Examiner

UNITED STATES PATENTS

| | | | |
|---|---|---|---|
| 2,829,288 | 4/58 | Schaefer | 310—90 |
| 2,983,832 | 5/61 | Macks | 310—90 |
| 3,031,973 | 5/62 | Kramer | 310—90 X |
| 3,034,004 | 5/62 | Von Cube | 310—90 |
| 3,121,396 | 2/64 | Aabye | 310—90 |

MILTON O. HIRSHFIELD, *Primary Examiner.*